United States Patent [19]
Ikeda

[11] Patent Number: 6,146,277
[45] Date of Patent: Nov. 14, 2000

[54] COMMAND INPUT METHOD AND RECORDING MEDIUM

[75] Inventor: Osamu Ikeda, Shinagawa-ku, Japan

[73] Assignee: Konami Co., Ltd., Hyogo-ken, Japan

[21] Appl. No.: 09/051,253

[22] PCT Filed: Aug. 20, 1997

[86] PCT No.: PCT/JP97/02877

§ 371 Date: Apr. 7, 1998

§ 102(e) Date: Apr. 7, 1998

[87] PCT Pub. No.: WO98/07486

PCT Pub. Date: Feb. 26, 1998

[30] Foreign Application Priority Data

Aug. 21, 1996 [JP] Japan ................................ 8-239882

[51] Int. Cl.[7] .............. A63F 13/00; A63F 9/24; G06F 17/00; G06F 19/00
[52] U.S. Cl. ................ 463/43; 463/31; 463/34; 463/44; 345/118; 345/156
[58] Field of Search .................. 463/43, 37, 36, 463/38, 42, 44, 45, 46, 47, 30, 31, 32, 33, 34; 273/148 B; 345/168, 156, 118, 115, 121

[56] References Cited

U.S. PATENT DOCUMENTS

| | | | |
|---|---|---|---|
| 5,649,861 | 7/1997 | Okano et al. ...................... | 463/30 X |
| 5,741,184 | 4/1998 | Takemoto et al. .................... | 463/43 X |
| 5,791,994 | 8/1998 | Hirano et al. ......................... | 463/43 X |
| 5,882,262 | 3/1999 | Ballhorn ................................ | 463/43 X |

Primary Examiner—Jessica J. Harrison
Assistant Examiner—Binh-An Nguyen
Attorney, Agent, or Firm—Jordan and Hamburg LLP

[57] ABSTRACT

This invention relates to a game system. The game system has a window image including an action command frame and a non-action command frame. When it is a player's turn to designate an action parameter, the window image including the action command frame and the non-action command frame is displayed on a display plane of display means of the game player to enable the game player to select a command in the action command frame or the non-action command frame and accept the selected command. Concurrently, a window image solely including the non-action command frame is displayed on a display plane of display means of the game player who is not assigned with the turn to enable the non-assigned game player to designate the command in the non-action command frame on the window image and accept the designated command while allowing the game player to see an overall image in a game space through the window image. Accordingly, while the opponent game player is in turn of using the action command, the non-assigned game player utilizes the non-action command frame, thereby allowing the game players to participate in a game more positively to establish a more pleasant game environment.

21 Claims, 7 Drawing Sheets

COMMAND INPUT METHOD AND RECORDING MEDIUM

FIELD OF THE INVENTION

This invention relates to a command input method and a recording medium adapted for a game system in which a cassette type recording medium or its equivalent such as an optic disc, a magnetic disc, or a semiconductor memory in which game data is recorded is used.

BACKGROUND ART

There have been proposed game systems of various types: a system built up by electrically connecting an electronic device exclusive for home use and a television (TV) monitor; a commercial-based apparatus such as an arcade game machine; and a system consisting of a personal computer or a work station combined with a display device and an audio output device. No matter what type the game system may be, the game system comprises a controller manipulated by a player, a recording medium in which game program data and game data such as video data and sound data are recorded, a Central Processing Unit (CPU) for controlling generation of sounds and images based on the game program data, a processor for processing image data, a processor for processing sound data, a Cathode Ray Tube (CRT) for displaying images, and a speaker for outputting sounds. As the recording medium, a CD-ROM, a semiconductor memory, and a cassette type memory in which a semiconductor memory is internally provided are mostly used. The arrangement of the game system is as mentioned above.

As the number of the types of the game systems is increased, the number of the types of games played by the game systems is also rapidly increased. Further, the content of the game becomes complex and is varied greatly. Recently, a game called "War Simulation Game" has been proposed. The content of the war simulation game is such that an army (or troops) belonging to one country (imaginary country) simulatively fights a battle against an army (or troops) belonging to another imaginary country in an imaginary world on a display plane of a TV monitor based on information such as the number of combatants in the army belonging to each of the countries, a manner of fighting, and an arrangement of the troops to determine the winner (country). In such a war simulation game, generally, two game players (or one player and a CPU) participate in the game, i.e., combat each other on the game system. In the case where the game is played by two players, it is necessary to electrically connect two game machines to be mutually communicable. In the case where the game is played by one player and the CPU, one game machine is necessary.

The following is a description as to how to play the game. Game participants (i.e., two players or one player & the CPU) are assigned with a turn in a certain order to act, i.e., to give a command to his/her/its troops. When the turn (hereinafter, referred to as a "phase") is assigned to one player, he is allowed to give a command to the troops of the country assigned to himself to initiate a certain operation in a game space.

When a command "ATTACK!" is given to the troops, the troops attacks those of the opponent country in the game space. The manner of attacking the opponent troops is displayed on the display plane in an animated manner according to lapse of time, and the displayed states, i.e., the current statuses of the respective armies are stored as a numerical value and updated according to lapse of time. This numerical value is used as a factor to determine the winner and also as a parameter for display of a status of the army which is described later.

Generally, in a battlefield defined in the game space, plural troops are arranged as an army belonging to one country, and each of the troops belonging to the same country can individually act during a phase assigned to the game player. The troops (or army) who finished a certain operation in the phase cannot act in the battlefield until the game player is assigned with his next phase.

When the game player is assigned with a phase, displayed is a window image which enables the game player to give a certain command to the army belonging to the game player. In the case where two game systems are electrically connected, the window image is displayed on a display plane of display means of the game system which is used by the game player assigned with the phase. In the case where the game is played by one player and a CPU, only one game system and one display means which are used by the game player are necessary since there is no need of displaying the window image for the CPU.

There are two types of commands: command messages which are directly related to a battle such as "ATTACK!" and "DEFEND!"; and information indicative of a status of the army such as "COMBAT ABILITY", "NUMBER OF COMBAT INCOMPETENTS", and "WINNING POSSIBILITY".

In the above game system, when it is the opponent's turn to play the game, i.e., the opponent game player is assigned with the phase, the game player who is not assigned with the phase (or non-assigned game player) has nothing to do but looking at a displayed image that his army is attacked by the opponent's army. Accordingly, there is a necessity to keep amusing the non-assigned game player in some way during the phase of the opponent's game player.

In view of the above, it is an object of this invention to provide a command input method and a recording medium which can provide a game player with a more pleasant game environment by keeping amusing the game player even while the game player is not assigned with a phase.

DISCLOSURE OF THE INVENTION

A command input method of this invention is used in a simulation game system in which two or more game players take a turn and designate an action command from an action command frame on a window image for having an object selected by the game player execute the action so as to let the objects of the players compete with each other in a game space defined on a display plane of display means, the window image including the action command frame and a non-action command frame, the command input method comprising the steps of: displaying the window image including the action command frame and the non-action command frame on the display plane of the display means of the game player when it is the game player's turn to designate an action parameter so as to enable the game player to select a command in the action command frame or the non-action command frame and accept the selected command; and displaying the window image solely including the non-action command frame on the display plane of the display means of the game player when it is not the game player's turn to designate the action parameter in such a manner as to allow the game player to see an image in the game space through the window image to enable the game player to select a command in the non-action command frame on the window image and accept the selected command.

According to the invention, the non-action command frame includes an information on a status of the object.

Further, according to the invention, a CPU of the game system plays a role as one of the game players, and the display means is exclusively used by the other game player.

Further, according to the invention, the CPU implements a task as the game player independently of a main process thereof.

Moreover, according to the invention, the game system is set such that at least two game machines are connected in a mutually communicable manner, and the game players of the game machines let the objects thereof compete with each other on the game system.

A recording medium of the invention is a medium configured in such a manner that a simulation game program is stored to be readable by a computer. The game program is configured in such a manner that two or more game players take a turn and designate an action command from an action command frame on a window image for having an object selected by the game player execute an action so as to let the objects thereof compete with each other in a game space defined on a display plane of display means, the recording medium storing a control program executing the following steps: a switching step for changing the turn of designation of the action command among the players; a judging step for judging whether or not the game player has designated display of the window image; a masking step for masking the action command frame of the window image on the display means of the game player when the game player is not assigned with the turn; a first window image display step for displaying the window image including the action command frame and a non-action command frame on the display plane of the display means of the game player when the game player is assigned with the turn upon receiving an instruction by the game player to display the window image; and a second window image display step for displaying the window image solely including the non-action command frame on the display plane of the display means of the game player when the game player is not assigned with the turn upon receiving an instruction by the non-assigned game player to display the window image.

According to the invention the non-action command frame includes an information on a status of the object.

According to the invention a CPU of the game system plays a role as one of the game players, and the display means is exclusively used by the other game player.

According to the invention set forth in claim 6, the CPU implements a task as the game player independently of a main process thereof.

Further, according to the invention the game system is set such that at least two game machines are connected in a mutually communicable manner, and the game players of the game machines let the objects thereof compete with each other on the game system.

The command input method having the above arrangements is used in a simulation game system in which two or more game players take a turn and designate an action command from an action command frame of a window image which enables an object selected by each of the game players to perform a certain action to let the objects compete with each other in a game space defined on a display plane of display means. The window image comprises the action command frame and the non-action command frame. When one of the game players is assigned with a turn to designate an action parameter, the window image including the action command frame and the non-action command frame is displayed on the display plane of the display means used by the game player to allow the game player to designate a certain command in the action command frame or the non-action command frame and accept the designated command. On the other hand, during the turn of the game player, the window image is displayed on the display plane of the display means of a non-assigned game player who is not assigned with the turn in such a manner that an overall image in the game space is seen through the window image. At this time, the game system allows the non-assigned game player to select a command in the non-action command frame and accepts the selected command in the non-action command frame. In other words, the non-assigned game player can utilize the non-action command frame while the turn is not assigned to the game player. Accordingly, even during the turn of the opponent game player, the non-assigned game player(s) can positively participate in the game, thereby providing the game player(s) with a more pleasant game environment.

According to this invention, the non-action command frame provides information indicative of a status of the object. Accordingly, even while the opponent game player uses an action command, the non-assigned game player can be informed of the current status to plan a strategy or countermeasures on a future game development so as to enable the game player to input a suitable command when the turn is assigned to the game player.

According to this invention, the CPU of the game system plays a role as one of the game players, and the display means of the game system is used by the other game player. This arrangement enables one game player and an imaginary opponent (i.e., CPU) to play a game while using only one game system and one display means. This is because the CPU does not need display means.

According to this invention, the CPU implements a task of playing a role as a game player separately from a main task of controlling an overall operation of the game system. Accordingly, compared to a case where the task as a game player is included in the main routine, an interval of processing graphics data can be shortened, thereby enabling display of a smoother animation image.

Further, according to this invention, at least two game systems are electrically connected to be mutually communicable, and a game is played by letting objects selected by game players combat each other using the respective game systems. With this arrangement, two or more game players can participate in the game.

BRIEF DESCRIPTION OF THE DRAWINGS

FIG. 4A showing an image of a battle scene, FIG. 4B showing a combined image of information and command messages, and FIG. 4C showing a synthesized image where the battle scene is seen through the information/command messages in a translucent state;

BEST MODE FOR CARRYING OUT THE INVENTION

A preferred embodiment of this invention is described in detail with reference to FIGS. 1 to 7.

It should be noted that the embodiment is described referring to the following items one by one in the order shown below:

A. Arrangement of Game System (see FIG. 1)
B. Function of CPU 51 shown in FIG. 1 (see FIG. 2)
C. Example of Game (see FIG. 3)
D. Example of Displayed Image (see FIG. 4)
E. Control Operation of CPU (see FIGS. 5, 6, and 7)

A. Arrangement of Game System (see FIG. 1)

Figure 1:
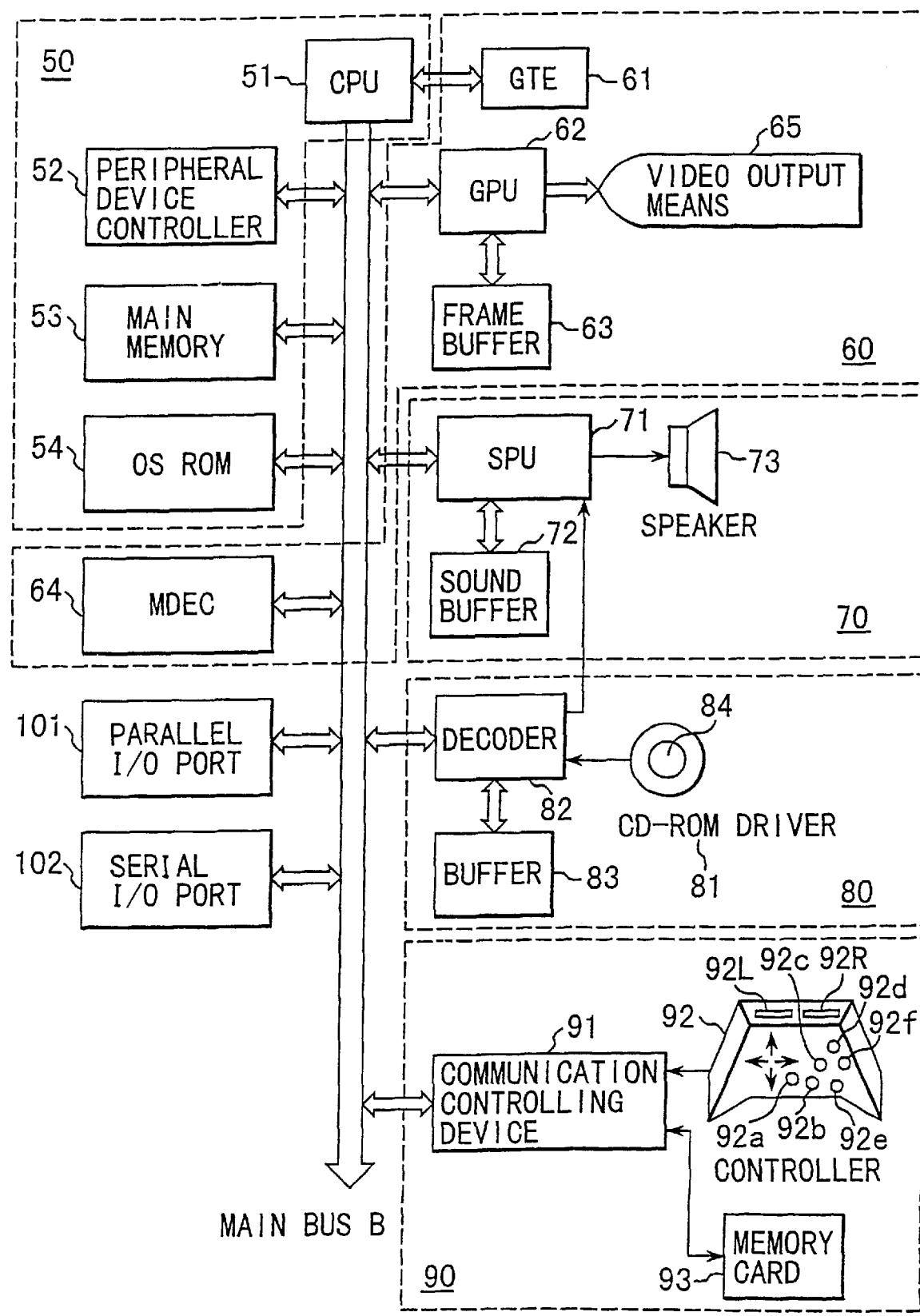
FIG. 1 is a diagram showing an arrangement of a game system as an embodiment of this invention.

An image processing system of this embodiment is, as disclosed in e.g., Japanese Unexamined Patent Publication No. HEI 8-212377, has the arrangement shown in FIG. 1. Specifically, this image processing system is arranged in such a manner that game program data is read out from an optical disc such as a CD-ROM to implement the game program, thereby allowing an image concerning the game to be displayed according to designation by a user (hereinafter, also referred to as a "player" or a "game player").

The image processing system comprises a main memory 53, a frame buffer 63, a geometry transfer engine (GTE) 61, a central processing unit (CPU) 51, a graphics processing unit (GPU) 62, and a video output means 65. The main memory 53 stores three-dimensional image data which is read out on a disc 84 such as a CD-ROM. The frame buffer 63 stores various data such as a table on color data, texture pattern data, data on designation of a translucency ratio as polygon characteristics data which is designated for each of polygons. The GTE 61 includes a coordinate transformer for transforming 3D image data which is read out on the CD-ROM 84 into two-dimensional image data after a transparency transformation process. The CPU 51 includes a graphics command generator for synthesizing the two-dimensional image data and the polygon characteristic data to generate a graphics command which is processed with respect to each of the polygons as a packet. The GPU 62 processes two-dimensional image data relating to graphics to be written in the frame buffer 63 based on the polygon characteristic data upon receiving the graphics command. The video output means 65 reads out the two-dimensional image data which is written in the frame buffer 63 in synchronism with a television signal to display the image on display means such as a display device.

More specifically, the image processing system comprises a control system 50, a graphics system 60, a sound system 70, an optical disc controller 80, a communication controller 90, and a main bus B. The control system 50 includes the Central Processing Unit (CPU) 51 and its peripheral device (or peripheral device controller) 52. The graphics system 60 includes the frame buffer 63 and the Graphics Processing Unit (GPU) 62 which is used for writing graphics image data in the frame buffer 63 for display of the image. The sound system 70 includes a sound processing unit (SPU) 71 for generating various sounds such as music and sound effects. The optical disc controller 80 is adapted for controlling an optical disc driver 81 to read out data on the optical disc (CD-ROM) 84 which is a sub storage medium as reproduced data, and controlling decoding of the reproduced data. The communication controller 90 controls input which is designated by the user via a controller 92, and input/output from a sub memory (memory card) 93 which stores conditions set on a game and the like. The main bus B electrically connects these units 50, 60, 70, 80, and 90.

The control system 50 includes the CPU 51, the peripheral device controller 52, the main memory 53, and a ROM 54. The peripheral device controller 52 implements various controls such as interruption control, time control, memory control, direct memory access (DMA) transfer, etc. The main memory 53 includes an RAM of, e.g., 2 megabyte (Mb). The ROM 54 has a storage capacity of e.g., 512 kilobyte (kb) in which program data such as a so-called operating system is stored for managing the main memory 53, the graphics system 60, the sound system 70 and the like.

The CPU 51 is, e.g., a processor of 32 bit which is used in a Reduced Instruction Set Computer (RISC). Implementing the operating system stored in the ROM 54 controls an overall operation of the image processing system. The CPU 51 is provided with a command cash and a scratch pad memory, and controls a real storage manager.

The graphics system 60 comprises the main memory 53, the Geometry Transfer Engine (GTE) 61, the Graphics Processing Unit (GPU) 62, the frame buffer 63, and an image decoder (hereinafter also referred to as a "MDEC") 64. The main memory 53 temporarily stores data which is read out from the CD-ROM 84. The GTE 61 includes a coprocessor used for coordinate computation which transforms coordinate data stored in the main memory 53. The GPU 62 processes graphics data based on a graphics command outputted from the CPU 51 to be written in the frame buffer 63. The frame buffer 63 includes a memory of, e.g., 1 Mb which is capable of storing graphics data processed by the GPU 62. The MDEC 64 is adapted for decoding image data which has been subject to an orthogonal functions system transformation such as a so-called discrete cosine transformation, subject to data compression and then coded.

The GTE 64 includes, e.g., a parallel operation (arithmetic) processor which implements a plurality of computations concurrently. In other words, the GTE 64 functions as a coprocessor of the CPU 51 and implements matrix and vector computations in terms of a fixed point at a high speed. Specifically, the GTE 64 implements coordinate transformation such as a transparency transformation and a light source computation (inner product computation) implemented by multiplying a normal line vector with a light source vector in accordance with a computation request from the CPU 51.

More specifically, in the case where a flat shading computation is implemented in which one color is assigned to a polygon of a triangular shape, the GTE 61 implements coordinate computation for polygons of maximum about 1.5 million pieces per second. Thereby, while reducing the burden on the CPU 51, the image processing system can implement a high speed coordinate computation. It should be noted that, throughout the description of this invention, a "polygon" is a minimum graphic unit which constitutes a three-dimensional object displayed on a display plane, and includes various polygonal shapes such as a triangle and a rectangle.

The GPU 62 is activated in response to a graphics command from the CPU 51 indicative of defining a graphic image based on the polygon, and outputs the processed graphic data to the frame buffer 63. The GPU 62 is capable of processing graphics data on polygons of maximum about 360,000 pieces per second. The GPU 62 manages a two-dimensional address space corresponding to the frame buffer 63 independently of the CPU 51 for mapping.

The frame buffer 63 includes a so-called dual port RAM, and is capable of receiving graphics data from the GPU 62 or allowing data to be transferred from the main memory 53, while simultaneously reading out data therefrom for display of the image.

The frame buffer 63 has a storage capacity of e.g., 1 Mb for processing matrix data of 1024 pixels in a row and 512 pixels in a line with each of the pixel data corresponding to a signal of 16 bit.

Image data corresponding to any desired region (or display area) of the frame buffer 63 is outputted to the video output means 65 such as a display device.

The frame buffer 63 includes a CLUT region which is a second memory region and a texture region which is a first memory region, in addition to the display region which is used for outputting image data for display of the image. In the CLUT region, a Color Lookup Table (CLUT) is stored which is used as a reference table when the GPU 62 writes the graphics data such as polygon data in the frame buffer 63. In the texture region, a texture is stored which has been subject to a coordinate transformation in writing the graphics data in the frame buffer 63. The texture is inserted (pasted) in the polygon (polygon data) written from the GPU 62. The CLUT region and the texture region are dynamically changed in accordance with an alteration of the display region. Specifically, the frame buffer 63 is accessible to the GPU 62 to enable display of the image in accordance with an alteration of the display region. Further, a high speed DMA transfer is enabled between the frame buffer 63 and the main memory 53.

The GPU 62 can implement Gouraud shading and texture mapping besides the flat shading. In the Gouraud shading, a color of a vertex of a polygon is subject to the linear interpolation to determine the color inside the polygon. In the texture mapping, a texture stored in the texture region is pasted in the polygon.

In the case where the Gouraud shading and the texture mapping are performed, the GTE 61 can implement coordinate computation for polygons of maximum about 0.5 million pieces per second.

The MDEC 64 decodes, in accordance with a control signal from the CPU 51, image data (still image or moving picture) which is read out from the CD-ROM 84 by driving the CD-ROM driver 81 and stored in the main memory 53 to store the decoded image data in the main memory 53. More specifically, the MDEC 64 can implement an inverse discrete cosine transformation (IDCT) computation at a high speed and expand data which has been read out from the CD-ROM 84 by driving the driver 81 and has been compressed according to a color still image coding system (so-called JPEG) or a storable media type moving picture coding system (so-called MPEG). It should be noted that, in this embodiment, the MPEG is used merely for compression of frame image data.

The image data reproduced by data expansion in the MDEC 64 is stored in the frame buffer 63 via the GPU 62 and is used as a background image which is synthesized by the GPU 62 for display of the image.

The sound system 70 includes the sound reproduction processor (SPU) 71, a sound buffer 72, and a speaker 73. The SPU 71 processes various sounds such as music and sound effects based on an instruction signal from the CPU 51. The sound buffer 72 has, e.g., a memory of 512 kb in which data concerning music and vocal sound and data on a sound source read out from the CD-ROM 84 by the CD-ROM driver 81 are stored. The speaker 73 is a sound output means for outputting various sounds processed by the SPU 71.

The SPU 71 has a function as an ADPCM decoder, a reproducer, and a modulator. As the ADPCM decoder, the SPU 71 reproduces sound data of 16 bit as a differential signal of 4 bit which has been processed according to Adaptive Differential Pulse Code Modulation (ADPCM). As the reproducer, the SPU 71 reproduces the sound source data which is stored in the sound buffer 72 to generate sounds such as the sound effects. As the modulator, the SPU 71 modulates the sound data which is stored in the sound buffer 72 for reproduction. More specifically, the SPU 71 automatically transforms action parameters while using looping and time as coefficients. The SPU 71 is internally provided with an ADPCM sound source capable of outputting 24 tones of voice and is activated in accordance with an operation signal from the CPU 51. The SPU 71 manages an address space corresponding to the sound buffer 72 independently of the CPU 51 for mapping, and transfers the ADPCM data from the CPU 51 to the sound buffer 72. The SPU 71 reproduces data which is directly read out from the sound buffer 72 upon receiving information on on/off operations of a key portion and modulation.

Having the above functions, the sound system 70 is used as a so-called sampling sound source which generates various sounds such as music and sound effects based on sound data stored in the sound buffer 72 upon receiving an instruction signal from the CPU 51.

The optical disc controller 80 includes the disc driver 81, a decoder 82, and a buffer 83. The disc driver 81 reproduces program data which is recorded on the optical disc (CD-ROM) 84. The decoder 82 decodes program data which is recorded with an error correction code (ECC). The buffer 83 has a memory of e.g., 32 kb for temporarily storing data which is reproduced by driving the disc driver 81. In other words, the optical disc controller 80 comprises various components such as the driver 81 and the decoder 82 which are necessary for reading out data from the optical disc 84. In this embodiment, data is stored in the format of such as CD-DA, CD-ROM, and XA. The decoder 82 constitutes part of the sound system 70.

Sound data which is recorded on the disc 84 and reproduced by driving the disc driver 81 includes so-called PCM data which is an analog-to-digital converted sound signal, in addition to the above ADPCM data (ADPCM data of CD-ROM or XA).

The ADPCM data is obtained by, e.g., processing digital data of 16 bit as a difference signal of 4 bit. The ADPCM sound data is subject to an error correction and decoded by the decoder 82, and then outputted to the SPU 71. After digital-to-analog conversion by the SPU 71, the data is used for driving the speaker 73.

The PCM sound data is recorded as e.g., digital data of 16 bit. This sound data is decoded by the decoder 82 for driving the speaker 73. The sound data outputted from the decoder 82 is temporarily stored in the SPU 71, mixed with an output signal from the SPU 71, and is finally outputted to the speaker 73 via a reverb unit.

The communication controller 90 includes a communication controlling device 91, a controller 92, and a memory card 93. The communication controlling device 91 controls communication between the CPU 51 and the controller 92 via the main bus B. The controller 92 inputs a designation of a player, and the memory card 93 stores data on setting conditions on a game.

The controller 92 is an interface for transmitting a designation by the player to a game software. The controller 92 is provided with various keys which are described later to input a designation of the player, and transmits a state represented by the designated key to the communication controlling device 91 according to a synchronous communication system in response to a designation request from the communication controlling device 91. A synchronous signal is transmitted about 60 times per second. Upon receiving the synchronous signal, the communication controlling device 91 transmits the state indicative of the designated key of the controller 92 to the CPU 51. A main body of the controller 92 has two connectors, and is connectable with a number of controllers via a multi tap device. Thereby, the player's designation is inputted to the CPU 51, which, in turn, implements a certain process in accordance with the designation of the player based on the game program which is being carried out currently.

Next, the various designation keys of the controller 92 are described. The controller 92 is provided with a cross (+) key portion consisting of a left (L) key, a right (R) key, an upper (U) key, and a down (D) key arranged in four directions with arrows pointing out the corresponding direction; and a first left button 92L1, a second left button 92L2, a first right button 92R1, a second right button 92R2, a start button 92a, a select button 92b, a first button 92c, a second button 92d, a third button 92e, and a fourth button 92f. Operating the cross key portion enables the player to give a command of directionalities (left, right, up or down) to the CPU 51. Pressing the start button 92a enables the player to designate the CPU 51 to initiate a certain operation according to the game program data which is read out from the CD-ROM 84 and written in the CPU 51. Pressing the select button 92b enables the player to designate various selections concerning the game program data which is read out from the CD-ROM 84 and written in the main memory 53.

The CPU 51 transmits data to the communication controlling device 91 when it is necessary to store the data concerning the setting conditions on the game or a result of the game when, e.g., the player finishes playing the game or stops playing the game on the way of the game. The communication controlling device 91 stores the data outputted from the CPU 51 in the memory card 93. The memory card 93 is electrically separable from the main bus B of the image processing system. Namely, the memory card 93 is so constructed as to be detachable from the image processing system even in a power ON state of the system. Thereby, the setting conditions on the game can be stored in plural memory cards 93.

The image processing system further comprises a 16 bit parallel input/output (I/O) port 101 and an asynchronous serial input/output (I/O) port 102 which are connected with the main bus B,. The image processing system is connectable with peripheral devices via the parallel I/O port 101, and is communicable with other video game apparatuses via the serial I/O port 102.

The main memory 53 needs to transmit a large quantity of image data to the GPU 62, the MDEC 64, and the decoder 82 at a high speed to enable reading out of the program data, display of an image or processing of graphics data. Accordingly, in the image processing system of this embodiment, a so-called DMA transfer is adopted to enable direct data transfer from the main memory 53 to the GPU 62, the MDEC 64, and the decoder 82 by controlling the peripheral device controller 52, i.e., without operating the CPU 51. Thereby, there can be reduced a burden on the CPU 51 due to the data transfer, and a high speed data transfer is enabled.

In this video game system, when power is supplied, the CPU 51 implements the operating system stored in the ROM 54. When implementing the operating system, the CPU 51 initializes an overall state of the system, e.g., verifies whether the system has been activated. Thereafter, the CPU 51 controls the optical disc controller 80 to implement the game program according to the game program data recorded on the optical disc 84. In implementing the game program, the CPU 51 controls the graphics system 60 and the sound system 70, etc. in accordance with an input by the player to control display of an image and generation of sound effects and music.

Next, a manner as to how an image is displayed on the display device according to this image processing system is described.

The GPU 62 controls the video output means 65 to display a content of any rectangular area in the frame buffer 63 on a display plane such as a CRT of the video output means 65. This rectangular area is hereafter referred to as a "display area". The size of the rectangular display area (size is indicated by the unit of pixel) is selectable according to a designated mode. For instance, in the mode "0", the size of the display area is 256 (in horizontal dimension)×240 (in vertical dimension) (at non interlace), and in the mode "9", the size of the display area is 384 (in horizontal dimension)× 480 (in vertical dimension) (at interlace). Specifically, the GPU 62 can designate the display area individually with respect to the horizontal direction and the vertical direction to point out a display start position and a display terminate position. The relationship between the display mode and the value settable for horizontal and vertical coordinates is such that: in the modes "0" and "4", the range settable for the horizontal coordinate is 0 to 276 (as the display start position for the horizontal coordinate) and 4 to 280 (as the display terminate position for the horizontal coordinate); and in the modes "8" and "9", the range settable for the horizontal coordinate is 0 to 396 (as the display start position for the horizontal coordinate) and 4 to 400 (as display terminate position for the horizontal coordinate). As for the vertical coordinate, in the modes "0" to "3" and "8", the range is 0 to 240 (as the display start position for the vertical coordinate), and in the modes "4" to "7" and "9", the range is 4 to 484 (as the display terminate position for the vertical coordinate). It is necessary to set the horizontal start position and the horizontal terminate position at a value of multiple of 4. Accordingly, the display area has a minimum size of 4 pixels (in the horizontal direction)×2 pixels (in the vertical direction) (at non-interlace) or 4 pixels (in the horizontal direction)×4 pixels (in the vertical direction) (at interlace).

The GPU 62 offers two modes as a mode relating to the number of displayable colors: 16 bit direct mode (32,768 colors can be exhibited) and 24 bit direct mode (full color can be exhibited). In the 16 bit direct mode (hereinafter referred to as "16 bit mode"), 32,768 colors can be displayed. Compared to the 24 bit direct mode (hereafter referred to as "24 bit mode"), this 16 bit mode has a limit on the number of displayable colors. However, computation on color which is implemented by the GPU 62 in processing graphics data is executed on the basis of 24 bit. Further, a so-called dither function is provided to simulatively raise a gradation level. Accordingly, a quasi full color (similar to 24 bit full color) is displayable. In the 24 bit mode, 26,777,216 colors (i.e., full color) is displayable. However, it should be noted that, in the 24 bit mode, the GPU 62 controls only image data (bit map data) which has been transferred into the frame buffer 63 to be displayable on the video output means 65, and is incapable of processing graphics data. Accordingly, despite the arrangement that the bit length of one pixel is 24 bit in the 24 bit mode, it is needed to designate the value of the coordinates and the display start/terminate positions in the frame buffer 63 on the basis of 16 bit . In other words, 24 bit image data of 640×480 is processed as data of 960×480 in the frame buffer 63. Further, it is necessary to set the horizontal display terminate position at a value of multiple of 8. Accordingly, the display area has a minimum size of 8 pixels (in the horizontal direction)×2 pixels (in the vertical direction) in the 24 bit mode.

The GPU 62 is further provided with various functions of processing graphics data as described below. Specifically, the GPU 62 is provided with functions of polygon/sprite graphics processing; polygon graphics processing, straight line graphics processing, and image transferring. In the polygon/sprite graphics processing, graphics data of such as 4 bit CLUT (4 bit mode, 16 colors/polygon, sprite), 8 bit CLUT (8 bit mode, 256 colors/polygon, sprite, and 16 bit CLUT (16 bit mode, 32,768 colors/polygon, sprite) can be processed with respect to a polygon or a sprite of an area ranging from 1×1 (dot) to 256×256 (dot). In the polygon graphics processing, while processing graphics data by designating a coordinate corresponding to each of the vertices of the polygon or the sprite on the display plane, various processings are implemented: a flat shading of applying one color to one polygon or one sprite; Gouraud shading of applying different colors on the vertices to make a gradation in the polygon or the sprite; and a texture mapping of preparing a texture pattern which is two-dimensional image data (pattern to be applied to the sprite is referred to as a "sprite pattern" in particular) and mapping the texture pattern/sprite pattern on the polygon/sprite. In the straight line graphics processing, gradation process is enabled. In the image transferring, image data is transferred from the CPU 51 to the frame buffer 63. The GPU 62 has other functions such as translucency processing, clipping, and offset designation. In the translucency processing, an average value of the pixels in one polygon is obtained to make the polygon translucent by blending the respective pixels at a certain ratio "α" obtained from the average value. This processing is also referred to as "α blending function". In the dithering, a noise signal is added to a boundary between different color areas. In the clipping, data beyond the display area is clipped for non-display. In the offset designation, the original point for the display area is shifted in accordance with an alteration of the display area.

The coordinate system for processing graphics data is defined on the basis of 11 bit with data necessary for attaching the plus (+) or minus (−) sign added thereto. Each of X-, Y-coordinates has a value ranging from −1024 to +1023. The size of the frame buffer 63 in this embodiment is 1024 pixels (horizontal coordinate)×512 pixels (vertical coordinate). Accordingly, if the graphics data to be processed by the GPU 62 is larger than the size of the frame buffer 63, the area which cannot be written in the frame buffer 63 is symbolically "folded". In other words, the original point of the X-, Y-coordinates is shifted to a desired value in the frame buffer 63 by using the offset designation function. Further, the clipping function enables graphics data corresponding to any rectangular display area in the frame buffer 63 to be securely processed, as far as the display area lies within the frame buffer 63. In addition, the CPU 62 is capable of processing a texture of the maximum size of 256 dots×256 dots. Accordingly, the horizontal or the vertical coordinate can be set at any value within this maximum value.

Image data which is to be applied (mapped) on the polygon or the sprite (i.e., texture pattern or sprite pattern) is stored in a nondisplay area of the frame buffer 63. The texture pattern or the sprite pattern is set in such a manner that an area of 256 pixels×256 pixels corresponds to one page, and as far as the storage capacity of the frame buffer 63 permits, the frame buffer 63 can store as many as texture patterns or sprite patterns in the form of pages. This area corresponding to 256 pixels×256 pixels is referred to as a "texture page". The location of the texture page is determined by allocating the page number to the texture page in writing the graphics data in the frame buffer 63. In other words, the page number is used as a parameter (index) used in designating the location (address) of the texture page.

There are three types of color modes in the texture pattern or the sprite pattern: 4 bit CLUT (4 bit mode); 8 bit CLUT (8 bit mode); and 16 bit CLUT (16 bit mode). A Color Lookup Table (CLUT) is used in the 4 bit and the 8 bit color modes.

The CLUT is a table in which data on three primary colors of Red (R), Green (G), and Blue (B) of a certain value representative of a color to be finally displayed on the display plane is stored. In the CLUT of 4 bit and 8 bit modes, 16 to 256 of RGB values are systematically stored in the frame buffer 63. The tables each storing R, G, B data of a certain value are given the ordinal number starting from the upper left table in the frame buffer 63. Referring to the table number stored in the frame buffer 63 enables display of the color of each of the pixels with respect to the designated texture pattern or sprite pattern. The CLUT can be selected per polygon or sprite. In other words, each of the polygons or the sprites can have an individual CLUT. The position of the CLUT in the frame buffer 63 is determined by designating the leftmost coordinate value of the CLUT which is used as a parameter (index) in writing the graphics data in the frame buffer 63.

The GPU 62 adopts a frame double buffering as a system for displaying a moving picture. According to the frame double buffering, two rectangular areas (display areas) are defined in the frame buffer 63 in such a manner that these two areas are alternately used for image display and writing of graphics data (graphics command). Specifically, while the graphics command is written in one area, the data in the other area is used for image display. When the writing operation in the one area is finished, the written data in the one area is used for image display, and in turn, another graphics command is written in the other area. Thereby, there can be avoided a possibility that a manner of over-writing the graphics command is displayed on the display area. A switching of the buffers (two areas) is performed during a period of outputting a vertical interval signal. The GPU 62 can freely set the rectangular display area corresponding to the graphic image to be displayed and the original point of the coordinate system. The arrangement that the display area and the original point are freely changeable enables two or even more buffers to be constructed according to this frame double buffering system.

The graphics command is implemented in the form of a packet. In this embodiment, two methods are available: direct designating method according to which the CPU 51 directly designates the graphics command; and a method according to which a dedicated hardware directly designates the graphics command. In particular, according to the method of direct designation by the dedicated hardware, a packet is configured in such a manner that a number of command words and a tag indicative of a next command are added to a command code used by the CPU 51. Thereby, a plurality of command strings which are not located in a continuous area in the frame buffer 63 are connected to implement the plural commands at the same time. In this case, transfer of graphics command data is performed by a dedicated hardware, and the CPU 51 has nothing to do with the data transfer.

The possible parameters containable in the graphics command are as follows:

CODE: command code and its optional code

R, G, B: luminosity which is shared by all the vertices

Rn, Bn, Gn: luminosity of the vertex "n"

Xn, Yn: two-dimensional coordinates in the graphics space including the vertex "n"

Un, Vn: two-dimensional coordinates of the point in the texture source space corresponding to the vertex "n"

CBA (CULT BASE ADDRESS): leader address of CLUT

TSB (TEXTURE SOURCE BASE): leader address of texture page and added information such as texture type For instance, in a graphics command for defining a triangle (command code: 1h), information on a vertex is given as a command argument following a command code including an optional code. It should be noted that the number of the arguments and the kind of a format vary according to the optional code.

The following is some of the parameters of the optional code:

IIP: kind of luminosity;

SIZ: size of rectangular area;

CNT: vertex which is used;

TME: texture mapping applied or not;

ABE: translucency processing applied or not;

TGE: multiplication of texture pattern with luminosity performed or not.

For example, when IIP is set at "0", one kind of luminosity (R, G, or B) is used to define a triangle (flat shading). When CNT is set at "0", a triangle is defined based on three vertices following the command code. When CNT is set at "1", two triangles are combined, i.e., a rectangle is defined based on four vertices following the command code. When TME is set at "0", texture mapping is turned off, while TME is set at "1", texture mapping is turned on. When ABE is set at "0", translucency processing is turned off, while ABE is set at "1", translucency processing is turned on. TGE is activated only when TME is set at "1", i.e., texture mapping is turned on. Specifically, when TGE is set at "0", the texture pattern is displayed after being multiplied by the luminosity, while when TGE is set at "1", solely the texture pattern is displayed.

In a straight line graphics command (command code: 2h), information on a single dot is given as a command argument following the command code including the optional code. The number of the arguments and the kind of the format vary according to the optional code. For instance, when IIP is set at "0", the pixel is subject to graphics processing based on the designated luminosity. When IIP is set at "1", the luminosities of the respective two vertices are linearly interpolated based on a displacement of a line segment along a longitudinal direction to process the graphics data. When CNT is set at "0", two terminal points following the command code are connected to define a straight line. When CNT is set at "1", the connected straight line is defined. When ABE is set at "0", translucency processing is turned off. When ABE is set at "1", translucency processing is turned on. In the case where a connected straight line is defined, a terminal code representative of a termination of the command code is required.

In a sprite graphics command (command code: 3h), information on the luminosity, the leftmost and lowermost terminal point in the rectangular area, the leftmost and uppermost terminal point in the texture source space, and the width and the height of the rectangular area is given as a command argument following the command code (including the optional code). The number of the argument and the kind of the format are varied according to the optional code.

Since, in the sprite graphics command, two pixels are processed at the same time, the two-dimensional coordinate Un in the texture source space corresponding to the vertex "n" is required to be allotted with an even number. Namely, 1 bit data of the lowest case is meaningless. When TME is set at "0", texture mapping is turned off, while TME is set at "1", texture mapping is turned on. When ABE is set at "0", translucency processing is turned off. When ABE is set at "1", translucency processing is turned on. When TGE is set at "0" (TGE is activated only when TME is turned on), texture pattern (in this case, sprite pattern) is multiplied with a certain luminosity to process the graphics data. When TGE is set at "1", only the texture pattern is graphically processed. The size of the display area is set by two digits: when SIZ is set at "00", the size is H; when set at "01", the size is 1×1; when set at "10", the size is 8×8; and when set at "11", the size is 16×16.

B. Function of CPU 51 Shown in FIG. 1 (See FIG. 2)

Figure 2:
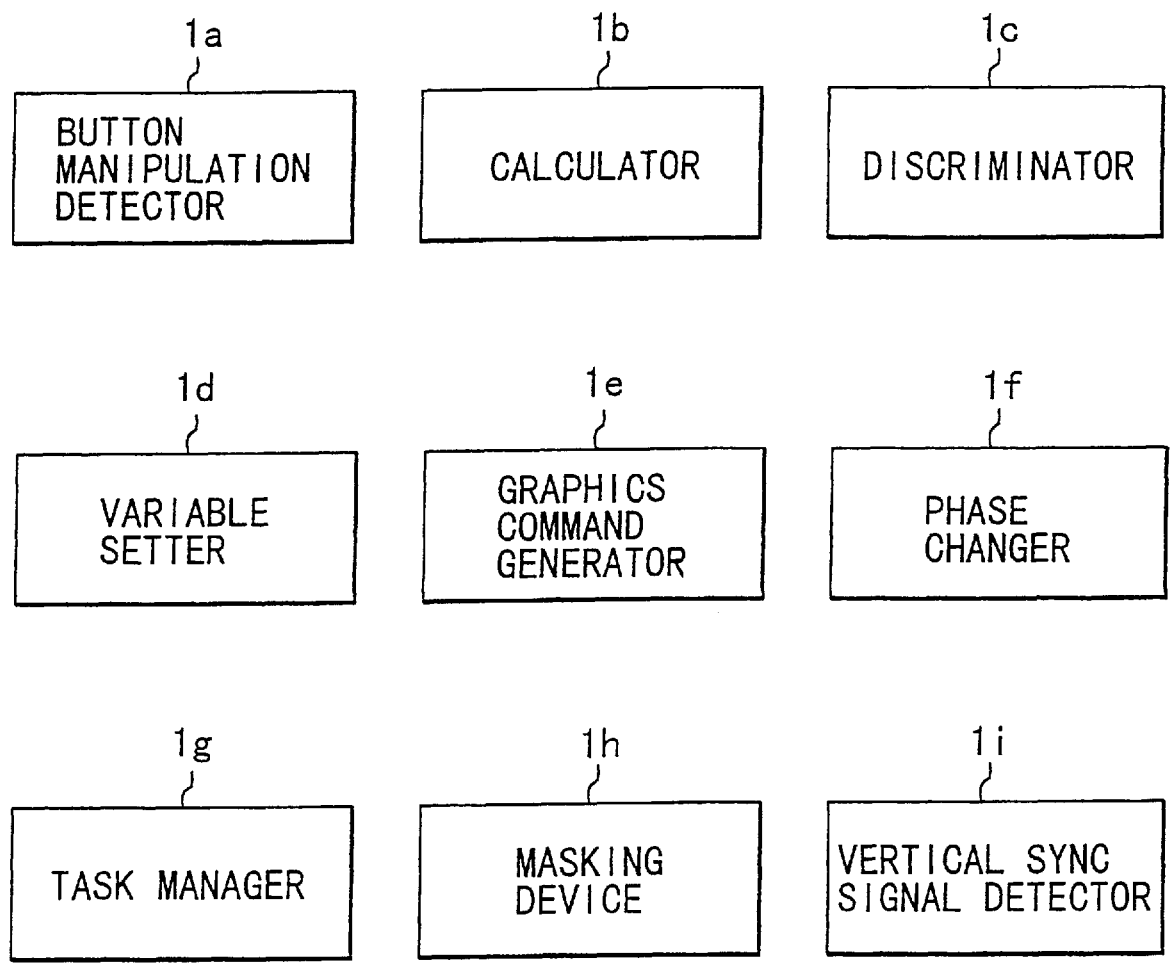
FIG. 2 is a block diagram showing functions of a CPU 51 in FIG. 1.

FIG. 2 is an explanatory diagram showing functions of elements of the CPU 51 of FIG. 1. The CPU 51 reads out the game program data recorded on the CD-ROM 84 shown in FIG. 1, and reads out the program data stored in the main memory 53, thereby carrying out the functions of the elements shown in FIG. 2. The CPU 51 shown in FIG. 2 comprises a button manipulation detector 1*a*, a calculator 1*b*, a discriminator 1*c*, a variable setter 1*d*, a graphics command generator 1*e*, a phase changer 1*f*, a task manager 1*g*, a masking device 1*h*, and a vertical synchronizing signal detector 1*i*. These elements primarily control operations which are described in the section D.

C. Example of Game (See FIG. 3)

Figure 3:
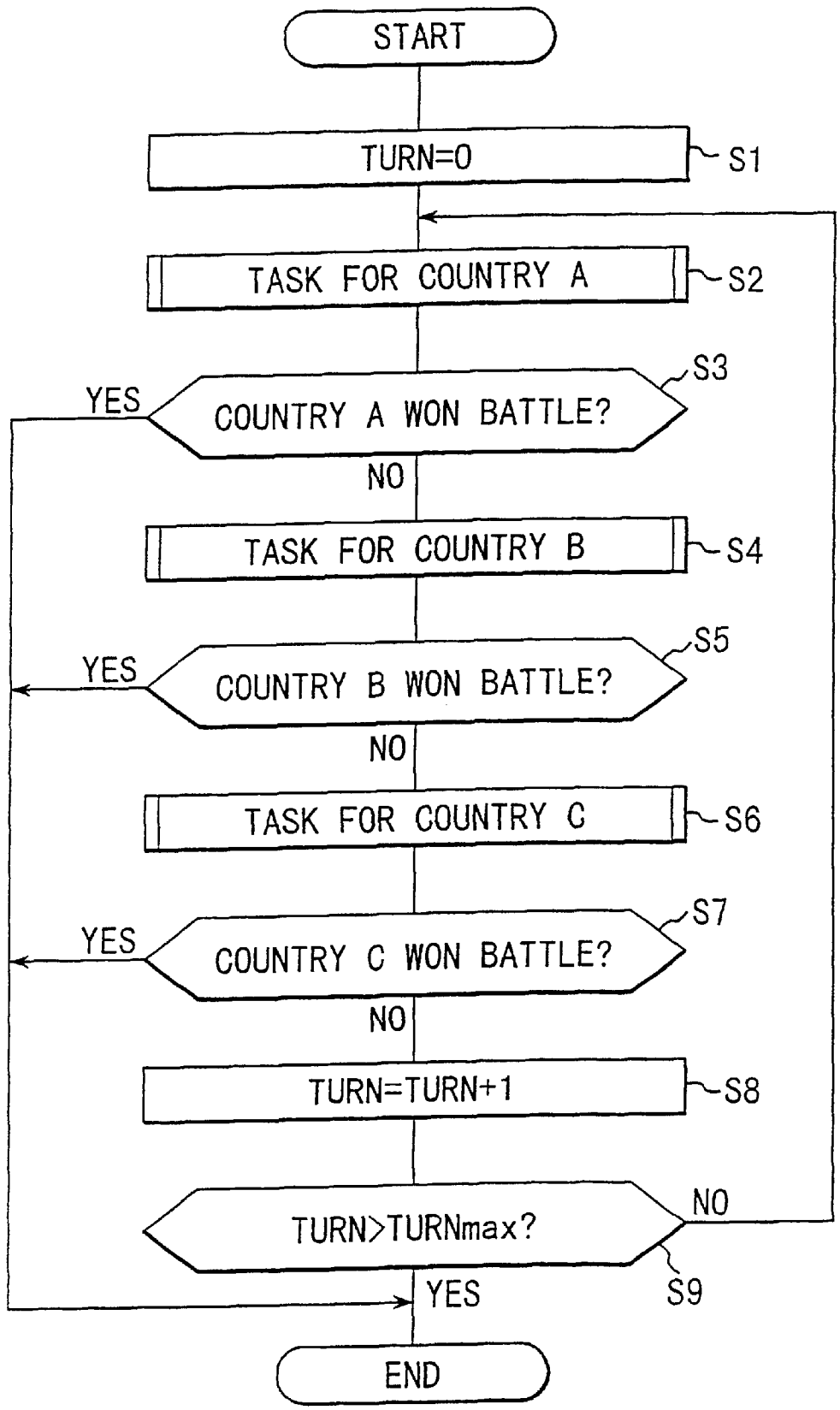
FIG. 3 is a flowchart showing an example of a game which is played on the game system of FIG. 1.

FIG. 3 is a flowchart showing a control operation along which a war simulation game is proceeded.

In Step S1, the CPU 51 substitutes "0" into the variable TURN, which represents a number of battles which take place.

In Step S2, the CPU 51 implements a task which is to be performed during a phase of the country A.

In Step S3, the CPU 51 judges whether the country A won the battle. If the judgement result is "YES", the CPU 51 terminates the task, and if the judgement result is "NO", this routine goes to Step S4. A judgement as to whether the country A won the battle is determined by a status of the armies of the countries B and C which have been attacked by the army of the country A. For instance, in the case where the army of the country B and the army of the country C are all destroyed, it is judged that the country A won the battle. A judgement as to whether the country B or the country C won the battle is determined in the similar manner.

In Step S4, the CPU 51 implements a task which is to be performed during a phase of the country B.

In Step S5, the CPU 51 judges whether the country B won the battle. If the judgement result is "YES", the CPU 51 terminates the task, and if the judgement result is "NO", this routine goes to Step S6.

In Step S6, the CPU 51 implements a task which is to be performed during a phase of the country C.

In Step S7, the CPU 51 judges whether the country C won the battle. If the judgement result is "YES", the CPU 51 terminates the task, and if the judgement result is "NO", this routine goes to Step S8.

In Step S8, the CPU 51 increments the value of the variant TURN by 1.

In Step S9, the CPU 51 judges whether the value of the variable TURN is greater than the maximum value TURN-max. If the judgement result is "YES", this routine ends, and if the judgement result is "NO", this routine returns to Step S2.

D. Example of Displayed Image (See FIG. 4)

Figure 4A:
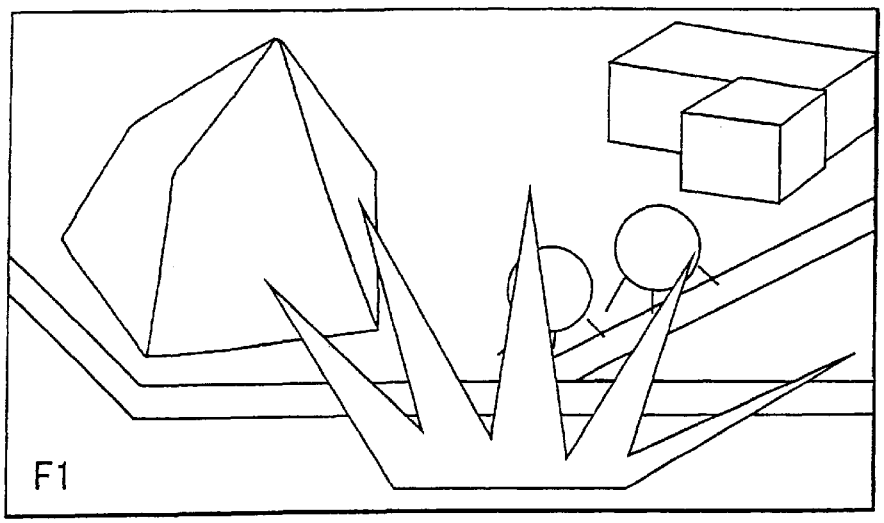
FIGS. 4A to 4C are explanatory diagrams respectively showing examples of displayed images.
Figure 4B:
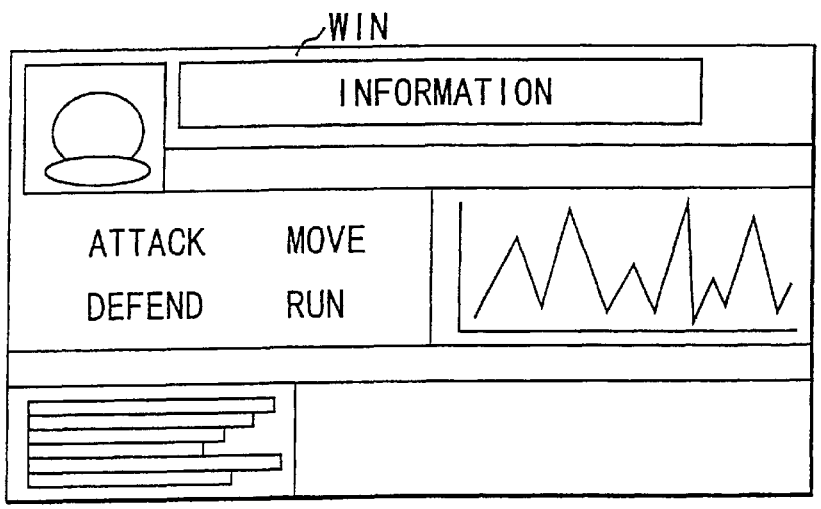
Figure 4C:
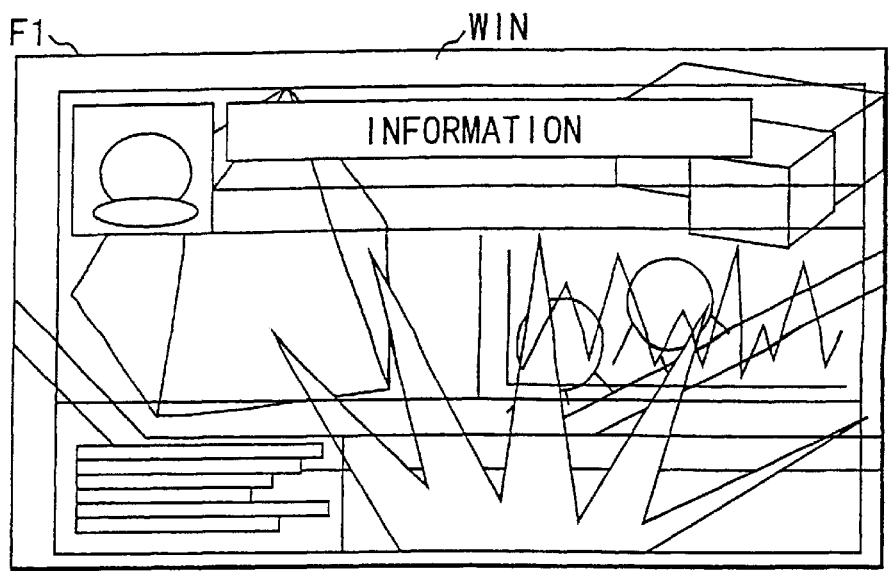

FIG. 4 is an explanatory diagram showing examples of displayed images in this embodiment. FIG. 4A shows a field image FI indicating a state of a battle scene. FIG. 4B shows a window image WIN used for inputting a command. FIG. 4C is a diagram showing a state that the window image WIN of FIG. 4B is displayed over the field image FI of FIG. 4A in a translucent manner.

In this embodiment, as shown in FIG. 4C, the window image WIN of FIG. 4B is superimposedly displayed over the field image FI of FIG. 4A in such a manner that the field image FI is seen through the window image WIN. Specifically, lines, characters, and graphics of the window image WIN of FIG. 4B are displayed over the field image FI on a display plane non-transparently (superimposedly) or translucently, while the remaining portion of the window image WIN (where no information is displayed) is displayed translucently or transparently over the field image FI. A selection among transparency, translucency, and non-transparency is performed by the graphics command generator 1e. As shown in FIG. 4B, the window image is used for selecting a command from various commands and inputting the selected command. As shown in FIG. 4B, there are two kinds of frames in the window image for inputting of the various commands: a non-action command frame where "information" or its equivalent is displayed so as to inform the game player of a status of the army of the country selected by the game player; and an action command frame where various action commands such as "ATTACK!", "MOVE!", "DEFEND!", and "RUN!" are displayed to enable the game player to command the army of the country selected by the game player to perform a certain action. When an information command in the non-action command frame is selected and designated, as shown in FIGS. 4B and 4C, the current status of the object or the army selected by the game player is displayed by means of a bar graph, a line graph and the like.

There are two display modes to display the window image WIN. One of the modes is, as shown in FIG. 4B, such that both the non-action command frame in which an information command is included to inform the game player of the status of the army of the country selected by the game player and the action command frame in which the action commands such as "ATTACK!", "MOVE!", "DEFEND!", and "RUN!" are included are displayed on the display plane of the game player as a combined image. Hereinafter, this mode is referred to as "action enabled display mode". This action enabled display mode is executable when the player is assigned with a phase.

The other mode is such that the non-action command frame in which the information command and the like are included is displayed on the display plane of the game player. Hereafter, this mode is referred to as "action disabled display mode". This action disabled display mode is executable by the game player when the CPU or the other game player is assigned with the phase (i.e., the game player is not assigned with the phase).

Use of the above two display modes differs according to a game condition. In this embodiment, there are at least two kinds of game conditions. One kind is such that one game system shown in FIG. 1 is used. In other words, a game is played between one game player and the CPU 51 of the game system, and the phase is assigned alternately to the game player and the CPU 51. In this case, the television monitor of the game system in FIG. 1 is exclusively used by the game player, because the CPU 51 does not need visual information displayed on the TV monitor. Accordingly, when the game player is assigned with the phase, the window image WIN of FIG. 4B is displayed on the display plane of the TV monitor of the game player, as shown in FIG. 4C, in such a manner that the field image FI of FIG. 4A is seen through the window image WIN. In this case, the action command frame shown in FIG. 4B which is used for giving a command to the army of the game player to act is displayed along with the non-action command frame. Specifically, the displayed mode shown in FIG. 4B is the action enabled display mode, and the game player who is assigned with the phase can play the game at this action enabled display mode. On the other hand, when the phase is assigned to the CPU 51, the window image WIN is displayed on the display plane of the TV monitor of the game player in such a manner that the field image FI of FIG. 4A is seen through the non-action command frame of the window image WIN, as shown in FIG. 4C. In this case, as shown in FIG. 4C, the action command frame for giving a command to the army of the game player to act is not displayed. This is because the phase is assigned to the CPU 51.

The other game condition is a case where plural game systems of FIG. 1 are used in such a manner that they are electrically connected to be mutually communicable. In this case, plural game players can join the game, and the phase is assigned to the game players in a certain order. The game players use the respective television monitors of the game systems. For instance, in the case where two game players play a game in a state that two game systems are connected to be communicable, the game is played in the following manner. Specifically, when the phase is assigned to the first game player, the window image WIN of FIG. 4B is displayed on the display plane of the TV monitor of the first game player, as shown in FIG. 4C, in such a manner that the field image FI of FIG. 4A is seen through the window image WIN. At this time, the action command frame shown in FIG. 4B which is used for giving a command to the army of the first game player to act is also displayed. In other words, this display mode is the action enabled display mode, and the first game player plays the game at the action enabled display mode. While the phase is assigned to the first game player, the window image WIN is displayed on the display plane of the TV monitor of the second game player in such a manner that the field image FI of FIG. 4A is seen through the window image WIN. At this time, however, the action command frame for giving a command to the army of the second game player to act is not displayed on the display plane of the TV monitor of the second game player, as shown in FIG. 4C. This is because the phase is assigned to the first game player. Contrary to the above, when the phase is assigned to the second game player, the displayed state is opposite to the state described above.

E. Control Operation (See FIGS. 5, 6, and 7)

Figure 5:
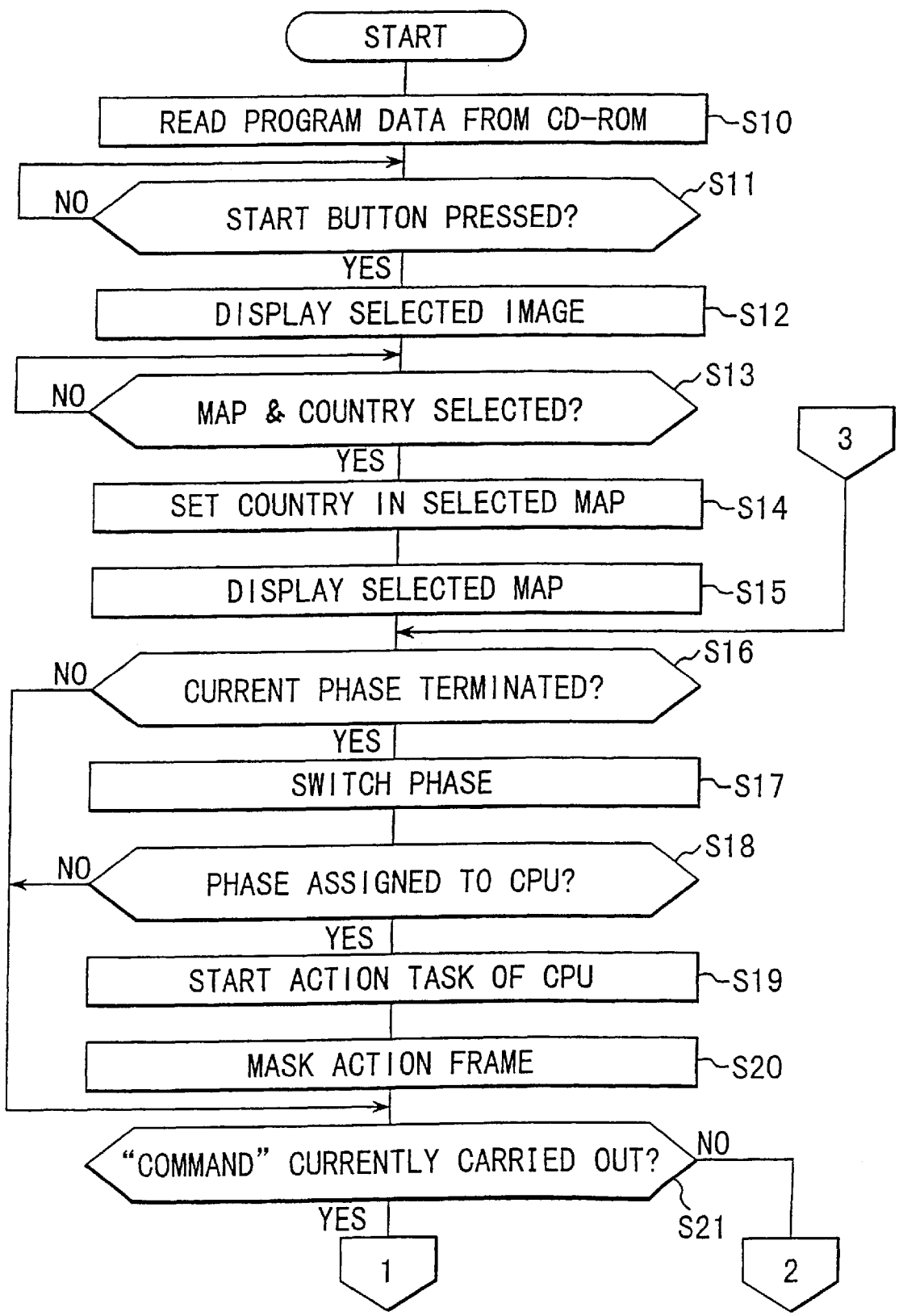
FIGS. 5 and 6 are flowcharts showing control operations of the game system of FIG. 1.
Figure 6:
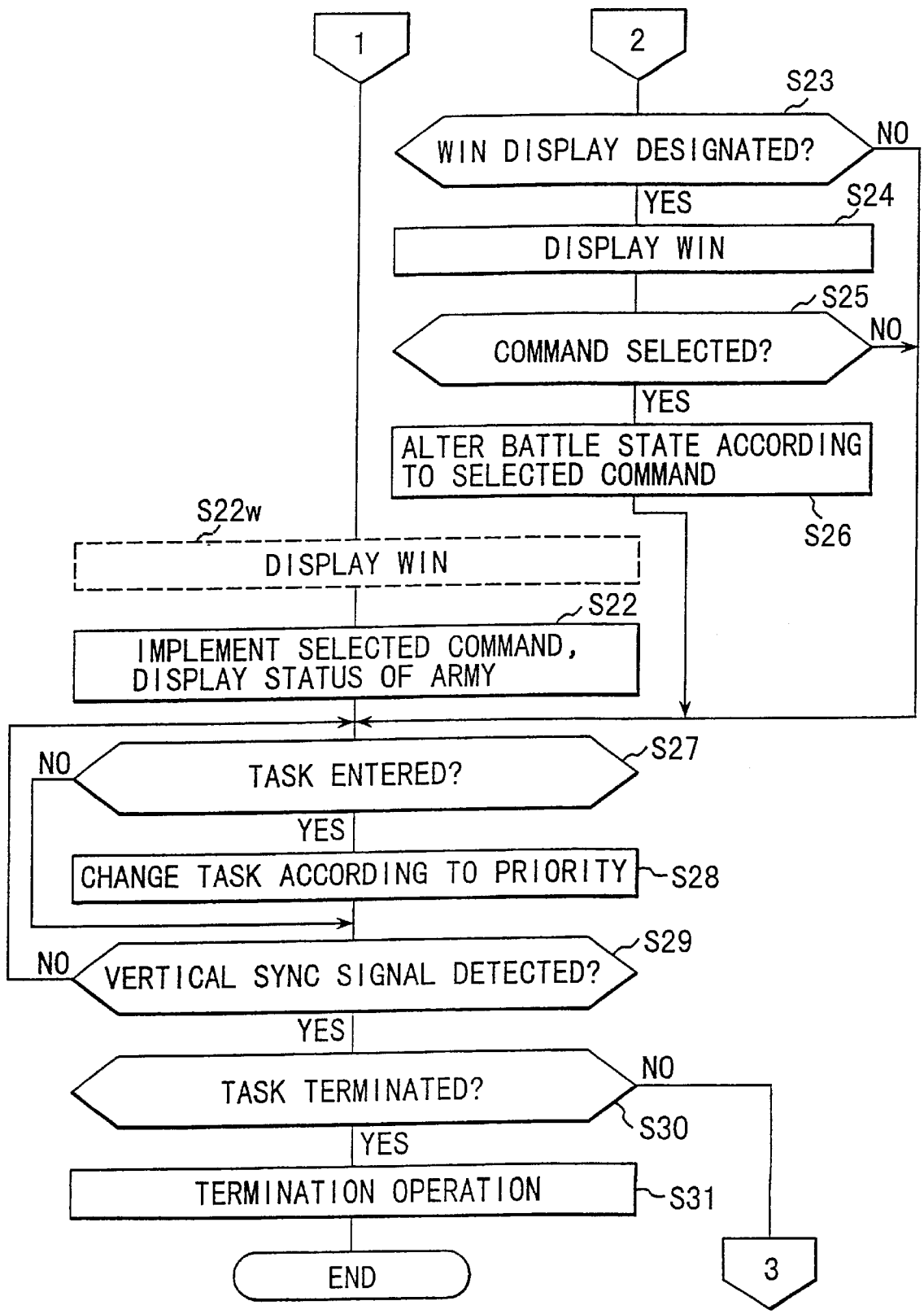

FIGS. 5 and 6 are flowcharts showing control operations in the case where the program data read out from the CD-ROM 84 shown in FIG. 1 is operated on the game system of FIG. 1. For the convenience of explanation, the operations are described under the game condition that a game is played between one game player and the CPU 51.

It should be noted that Step S10 shows a control operation executed by the operating system stored in the ROM 54 of FIG. 1, and the other steps show control operations executed by the game program data read out from the CD-ROM (optical disc) 84. As described above, a main control according to the game program data is performed by the elements shown in FIG. 2.

In Step S10, upon receiving a command signal from the operating system, the decoder 82 reads out image/sound data and game program data by operating the CD-ROM driver 81. The game program data is stored in the main memory 53 and read out therefrom. Thereby, the CPU 51 is enabled to implement the functions shown in FIG. 2. At this time, the image data, i.e., the texture data is stored in the non-display area of the buffer 63, and is assigned with a texture data number identifying the individual texture data. The sound data is stored in the buffer 72, and is assigned with a sound data number identifying the individual sound data. Generally, it is not always the case that every image data and sound data are stored in the buffer 63 and the buffer 72 respectively in Step S1. However, for the convenience of explanation, it is assumed that, in Step S10, all the image data and the sound data are stored in the corresponding buffer.

In Step S11, the button manipulation detector 1a judges whether the start button 92a of the controller 92 is pressed. If the judgement result is "YES", the routine goes to Step S12.

In Step S12, the graphics command generator 1e generates a graphics command instructing writing of graphics data of a selected image and outputs the graphics command to the GPU 62 of FIG. 1. The GPU 62, upon receiving the graphics command, controls the graphics data of the selected image to be written in the display area of the buffer 63. Thereby, the selected image is displayed on the display plane of the TV monitor.

In Step S13, the discriminator 1c judges whether a map (or an area where the armies fight a battle) and countries (participant countries) in which the battle takes place are selected. If the judgement result is "YES", this routine goes to Step S14. Then, a small map (or a small area) is selected from the big map, and one participant country is selected among the plural participant countries located in the selected small area. For example, when the game player selects one country under the condition that he plays the game with the CPU 51, one or more countries of the rest of the participant countries is or are controlled by the CPU 51. It should be noted that the big map (large area) corresponds to e.g., the world on the earth, and the small map (small area) corresponds to e.g., a region of the world such as Asia consisting of several countries. The field image FI of FIG. 4A depicts some part of the map.

In Step S14, the CPU 51 sets the participant countries within the selected map.

In Step S15, the graphics command generator 1e generates a graphics command to the GPU 62 indicative of writing graphics data of the selected map. Upon receiving the graphics command, the GPU 62 writes the image data of the selected map in the display area of the buffer 63. Thereby, the field image FI of FIG. 4A is displayed on the display plane of the TV monitor.

In Step S16, the discriminator 1c judges whether the current phase is terminated. If the judgement result is "YES", the routine goes to Step S17.

Figure 7:
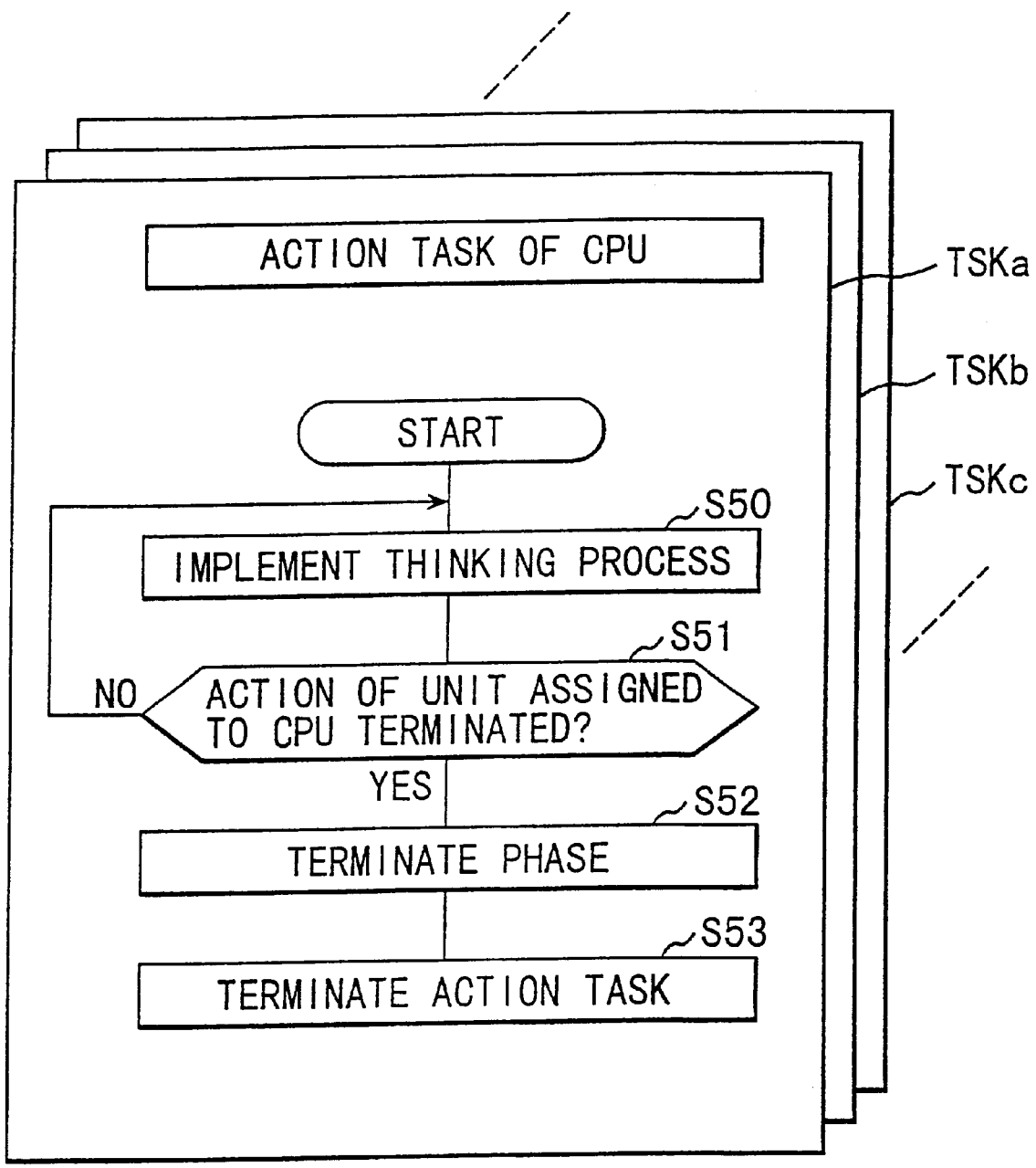
FIG. 7 is a diagram showing one of tasks processed by the CPU.

In Step S17, the phase changer 1f switches the phase. The switching operation of the phase is executed based on a timing that the task corresponding to the current phase is terminated and a next task is started. The term "task" in this section means a program which is separately and independently processed by the CPU 51 apart from the main routine. As shown in FIG. 7, there are many tasks implemented by the CPU 51: action tasks, access tasks which are accessible to the recording medium, etc. These tasks are managed on a table by the task manager 1g. Data indicative of the respective tasks and data indicative of the priority of implementing the task are registered on the table. The task manager 1g reads the data on the table and controls the task which is allotted with a higher priority to be activated. As shown in FIG. 7, for example, an action task TSKa according to which the CPU 51 plays a role as a game player assigned with one country (or countries) includes operations of Steps S50 to S53. In Step S50, the CPU 51 implements a thinking process. In Step S51, it is judged whether the action of a "unit" (or troops) of the army assigned to the CPU 51 is terminated. In Step S52, the CPU 51 terminates the phase assigned thereto. In Step S53, the CPU terminates the task TASKa. The task terminate process in Step S53 is such that the CPU 51 stops the process on the halfway through the process and releases the processed resources when the CPU 51 is interrupted or set into a standby state somehow.

In Step S18, the discriminator 1c judges whether the CPU 51 is assigned with a next phase. If the judgement result is "YES", the routine goes to Step S19, and if the judgement result is "NO", the routine goes to Step S21.

In Step S19, the task manager 1g starts the action task of CPU 51.

In Step S20, the masking device 1h masks the action command frame which enables the game player to give an action command to a "unit" of the game player. Specifically, the masking device 1h supplies information, to the graphics command generator 1e, instructing generation of a graphics command except an action command which enables the "unit" of the game player to perform a certain action. Thereby, the graphics command generator 1e gives the GPU 62 a command indicative of displaying the window image WIN except the action command frame which enables designation of an action command. Thereby, as shown in FIG. 4C, the window image WIN is displayed on the display plane of the TV monitor in such a manner that the field image FI of FIG. 4A is seen through the window image WIN. In this case, the action command frame used for giving an action command to the "unit" is not displayed, as shown in FIG. 4C. The term "unit" used in this section means a plurality of troops of the army which is assigned to the game player or the CPU 51. These plural troops spontaneously perform the action designated by the action command as a unit.

In Step S21, the discriminator 1c judges whether a "command" is currently carried out. If the judgement result is "YES", this routine goes to Step S22, and if the judgement result is "NO", this routine goes to Step S23. The term "command" used in this section includes an instruction of e.g., displaying the window image WIN on the display plane and a command message displayed on the window image WIN. Step S22w indicated by a dashed line block in FIG. 6 follows Step S22 for the following reasons. The "command" in Step S2 1 represents all kinds of "commands". Namely, the "command" in Step S21 includes an instruction of displaying the window image WIN on the display plane when the button designating display of the window image WIN is pressed. Accordingly, in Step S22w, an operation of displaying the window image WIN is implemented in response to pressing of the button designating display of the window image WIN. The window image display in Step S22w is one operation of Step S22. Further, in the window image display of Step S22w, only the non-action command frame is displayed, and the action command frame is concealed. This is because, in Step S20, the action command frame is already masked.

In Step S22, a command from the game player who is assigned with the phase (or the CPU 51 if the CPU 51 is assigned with the phase) is implemented. Specifically, in this step, a battle is fought based on the numerical level set by the calculator 1b, and the battle scene is displayed on the display plane of the TV monitor in accordance with the graphics generation of the graphics command generator 1e. Also, in this step, a command from the game player who is not assigned with the phase (or the CPU 51), i.e., an operation of displaying the status of the army of the non-assigned game player is implemented by the graphics command generator 1e.

In Step S23, the discriminator 1c judges whether the window image display is designated based on a detection result by the button manipulation detector 1a. If the judgement result is "YES", this routine goes to Step S24, and if the judgement result is "NO", this routine goes to Step S27.

In Step S24, the graphics command generator 1e outputs an instruction signal to the GPU 62 indicative of display of the window image WIN. The window image WIN to be displayed in this step includes the non-action command frame and the action command frame.

In Step S25, the discriminator 1c judges whether a command is selected or designated based on a detection result by the button manipulation detector 1a. If the judgement result is "YES", this routine goes to Step S26, and if the judgement result is "NO", this routine goes to Step S27.

In Step S27, the task manager 1g judges whether a task is entered by referring to the table. If the judgement result is "YES", this routine goes to Step S28, and if the judgement result is "NO", this routine goes to Step S28.

In Step S28, the task manager 1g controls the task with a higher priority to be started first.

In Step S29, the vertical synchronizing signal detector 1i judges whether a vertical synchronizing signal is detected. If the judgement result is "YES", this routine goes to Step S30, and if the judgement result is "NO", this routine returns to Step S27.

In Step S30, the discriminator 1c judges whether the task is terminated based on a detection result by the button manipulation detector 1a. If the judgement result is "YES", this routine goes to Step S31, and if the judgement result is "NO", this routine returns to Step S16.

In Step S31, the CPU 51 processes a termination operation. The termination operation in Step S31 includes an operation that the current status of the army is stored in the memory card 93 as numerical data to enable restart of the game under the current status.

As described above, in this embodiment, the window image WIN for selecting and inputting various commands is displayable at two modes. Specifically, in the action enabled display mode, the action command frame where various action commands such as "ATTACK!", "MOVE!", "DEFEND!", "RUN!" are included, and the non-action command frame where information such as the status of the army of the country designated by the game player are included are displayable as a combined image. In the action disabled display mode, only the non-action command frame is displayable in which information such as the status of the army of the country selected by the game player according to the information command is included. When a game player is assigned with a phase, the window image WIN is displayed on the TV monitor of the game player during the phase of the game player at the action enabled display mode, whereas the window image WIN is displayed on the TV monitor of a non-assigned game player during the phase of the assigned game player at the action disabled display mode. In other words, the non-action commands such as information are displayed in the window image WIN of the non-assigned game player during the phase of the assigned game player because the window image WIN is operable at the action disabled display mode for the non-assigned game player.

As mentioned above, the one type of game condition is such that the game is played between one game player and the CPU 51 of the game system. In this case, one game system shown in FIG. 1 is used. When the phase is assigned to the game player, the window image WIN is displayed on the display plane of the TV monitor of the game player in such a manner that the field image FI is seen through the window image WIN with the action command frame. On the other hand, when the phase is assigned to the CPU 51, the window image WIN is displayed on the display plane of the TV monitor in such a manner that the field image FI is displayed through the window image WIN with the action command frame masked.

The other game condition is the case where plural game systems of FIG. 1 are used in such a manner that they are connected to be mutually communicable. In this case, plural game players can join the game. For instance, in the case where two game players play the game with two game systems connected to be mutually communicable, the game is played in the following manner. Specifically, when the phase is assigned to the first game player, the window image WIN is displayed on the display plane of the TV monitor of the first game player in such a manner that the field image FI is seen through the window image WIN with the action commands. At this time, the window image WIN is displayed on the display plane of the TV monitor of the second game player in such a manner that the field image FI is seen through the window image WIN with the action commands masked.

Accordingly, in the case where one game system is used and the game is played between one game player and the CPU 51, the game player can input the action commands while watching the state of the battle scene during the phase of the game player. Further, while the game player is not assigned with the phase, the game player can see the information or its equivalent while watching the state of the battle scene. Accordingly, even while the game player is not assigned with the phase, the game system can provide the non-assigned game player with information on the current battle status to enable the game player to make a strategy on a next action to be performed when the game player is assigned with a next phase, while keeping amusing the game player during the non-assigned phase. Therefore, the game system of this invention is capable of providing the game player with a more pleasant game environment.

In the case where a plural game systems are used and the game is played among plural game players, when one game player is assigned with a phase, the game player can input the action commands while watching the state of the battle scene during the phase of the game player. Further, even while the game player is not assigned with the phase, the game player can see the information or its equivalent while watching the state of the battle scene. Accordingly, even while the game player is not assigned with the phase, the game system can provide the non-assigned game player with information on the current battle status to enable the game player to make a strategy on a next action to be performed when the game player is assigned with a next phase, while keeping amusing the game player during the non-assigned phase. Therefore, the game system of this invention is capable of providing the game player with a more pleasant game environment.

In the above embodiment, when the game player is assigned with a phase, the window image WIN is displayed on the display plane of the TV monitor of the game player in such a manner that the field image FI of FIG. 4A is seen through the window image WIN of FIG. 4B. As a modification, merely the window image WIN of FIG. 4B may be displayable, while masking the field image FI. In this case, while the game player is assigned with the phase, the field can be displayed on the TV monitor of the game player. Accordingly, the game player can input a suitable command while being informed through the TV monitor of a battle development of the army of the game player which is supposed to correspond to the field image FI. Thereby, this modified game system can also provide the game player(s) with a pleasant game environment.

The above embodiment is described referring to the two game conditions: one is such that one game player and the CPU 51 play the game using one game system; and the other is such that plural game players play the game using plural game systems. The command input method is also applicable to the case where two game players and the CPU 51 play the game using one game system, and plural game players and one or more CPUs play the game using plural game systems. Namely, the command input method of this invention can provide the displayed state similar to the one described in the embodiment. In the modification, however, the display device needs to be supplied to the game players individually.

Other drivers such as hard disc driver, optical disc driver, flexible disc driver, silicon disc driver, and cassette type memory reader may be used in place of the CD-ROM driver 81. Other memory means such as hard disc, optical disc, flexible disc, and semiconductor memory may be used in place of the disc (CD-ROM) 84. The CD-ROM driver 81 drives the CD-ROM (disc) 84 to read out image data, sound data, and game program data recorded thereon, and outputs the read out data to the CD-ROM decoder 82 as reproduced data. The CD-ROM decoder 82 applies an error correction to the reproduced data outputted from the CD-ROM driver 81 according to Error Correction Code (ECC) to output the error corrected data to the buffers 83 and the like.

As mentioned above, this invention is directed to a command input method used in a simulation game system in which two or more game players take a turn and designate an action command from an action command frame of a window image which enables an object selected by each of the game players to perform a certain action to let the objects compete with each other in a game space defined on a display plane of display means. The window image comprises the action command frame and the non-action command frame. When one of the game players is assigned with a turn to designate an action parameter, the window image including the action command frame and the non-action command frame is displayed on the display plane of the display means used by the game player to allow the game player to designate a certain command in the action command frame or the non-action command frame and execute the designated command. On the other hand, during the turn of the game player, the window image is displayed on the display plane of the display means of a non-assigned game player who is not assigned with the turn in such a manner that an overall image in the game space is seen through the window image. At this time, the game system allows the non-assigned game player to select a command in the non-action command frame and perform the selected command in the non-action command frame. In other words, the non-assigned game player can utilize the non-action command frame while the turn is not assigned to the game player. Accordingly, even during the turn of the opponent game player, the non-assigned game player(s) can positively participate in the game, thereby providing the game player (s) with a more pleasant game environment.

According to this invention, the non-action command frame provides information indicative of a status of the object. Accordingly, even while the opponent game player uses an action command, the nonassigned game player can be informed of the current status to make a strategy or countermeasures on a future game development so as to enable the game player to input a suitable command when the turn is assigned to the game player.

According to this invention, the CPU of the game system plays a role as one of the game players, and the display means of the game system is used by the other game player. This arrangement enables one game player and an imaginary opponent (i.e., CPU) to play a game while using only one game system and one display means. This is because the CPU does not need display means.

According to this invention, the CPU implements a task of playing a role as a game player separately from a main task of controlling an overall operation of the game system. Accordingly, compared to a case where the task as a game player is included in the main routine, an interval of processing graphics data can be shortened, thereby enabling display of a smoother animation image.

Further, according to this invention, at least two game systems are electrically connected to be mutually communicable, and a game is played by letting objects selected by game players combat each other using the respective game systems. With this arrangement, two or more game players can participate in the game.

What is claimed is:

1. A command input method used in a simulation game in which two or more competitors are assigned turns to designate an action parameter to enable execution of an action in the simulation game, the command input method comprising the steps of:

displaying a window image including an action command frame and a non-action command frame on a display of one competitor when it is said one competitor's assigned turn to designate an action parameter;

enabling said one competitor having the assigned turn to effect execution of a command in the action command frame or the non-action command frame;

assigning another competitor a turn after said one competitor has effected execution of said command; displaying the window image including the non-action command frame while excluding display of the action command frame on the display of said one game competitor when it is said other competitor's assigned turn to designate an action parameter; and enabling said one competitor when it is said other competitor's assigned turn to designate an action parameter to effect execution of a command in the non-action command frame.

2. The command input method set forth in claim 1 comprising providing the non-action command frame with information on the status of the simulation game.

3. The command input method set forth in claim 1 comprising utilizing a CPU of the simulated game to play a role as one of the competitors, and providing for exclusion use of the display by said one competitor.

4. The command input method set forth in claim 1 comprising utilizing a CPU of the simulated game to play a role of one of the competitors independently of a main process of the CPU.

5. The command input method set forth in claim 1 comprising utilizing at least two game machines connected in a mutually communicable manner, and enabling a competitor at each game machine to compete with each other on the simulated game.

6. The command input method set forth in claim 1 further comprising the step of displaying a window image including the action command frame and the non-action command frame on a display plane of a display device of said one competitor when it is said one competitor's assigned turn to designate an action parameter so as to enable the last said competitor to see an image in the display device through the window image.

7. The command input method set forth in claim 1 further comprising the step of displaying the window image including the action command frame and the non-action command frame while excluding display of a game image on the display plane of the display device of said one competitor when it is said one competitor's turn to designate the action parameter so as to enable the last said competitor to select the command in the action command frame or the non-action command frame on the window image.

8. A recording medium in which a simulation game program is stored to be readable by a computer, the game program being configured in such a manner that two or more competitors take turns to designate an action parameter from an action command frame on a window image for having an object selected by the competitor execute an action so as to let the objects thereof compete with each other in a game space defined on a display plane of a display device, the recording medium storing a control program executing the following steps:

a switching step for changing the assigned turn of competitors to designate an action parameter;

a judging step for judging whether the competitor has designated a display of the window image;

a masking step for masking the action command frame of the window image on the display device of the competitor when the last said competitor has not been assigned a turn;

a first window image display step for displaying the window image including the action command frame and the non-action command frame on the display plane of the display device of the competitor who has been assigned the turn upon receiving an instruction by the assigned competitor to display the window image; and a second window image display step for displaying the window image including the non-action command frame and excluding the action command frame on the display plane of the display device of the competitor who is not assigned the turn upon receiving an instruction by the non-assigned competitor to display the window image.

9. The recording medium set forth in claim 8 wherein the non-action command frame includes information on the status of the game.

10. The recording medium set forth in claim 8 comprising utilizing a CPU of the game to play a role as one of the competitors.

11. The recording medium set forth in claim 8 wherein the CPU plays the role as one of the competitor independently of the main process of the CPU.

12. The recording medium set forth in claim 8 comprising utilizing at least two game machines connected in a mutually communicable manner, and enabling a competitor at each game machine to compete with each other.

13. The recording medium set forth in claim 8 comprising effecting the step of displaying the window image including the action command frame and the non-action command frame on the display plane of the display device in such a manner that an image in the game space is seen through the window image.

14. The recording medium set forth in claim 8 wherein, in the first window image display step, the window image including the action command frame and the non-action command frame are displayed on the display plane of the display means while excluding display of the game image in the game space.

15. A game apparatus comprising:

a display device displaying a game image;

an input device which enables input of a designation by a game competitor;

a controller controlling the display device to display the game image on the display device according to the designation of the game competitor;

the controller including a switching device for enabling the input device to provide an assigned turn and a non-assigned turn among two or more competitors such that a competitor with an assigned turn provides an input to said input device to effect execution of an action; and a game image provider for providing the competitor with the assigned turn with a window image having an action command frame and a non-action command frame and providing the competitor with a non-assigned turn with a window image having the non-action command frame and excluding the action command frame.

16. The game apparatus set forth in claim 15 wherein the non-action command frame display information on the status of the game.

17. The game apparatus set forth in claim 15 wherein the controller plays a role as one of the competitors.

18. The game apparatus set forth in claim 15 wherein the controller plays the role as the competitor independently the main processing of the controller.

19. The game apparatus set forth in claim 15 further comprising a plurality of game sub-systems, each of the game sub-systems including a display device and an input device.

20. The game apparatus set forth in claim 15 wherein the game image provider provides the competitor with the assigned turn with the game image which has a game space to be displayed on the display device in addition to having the window image having the action command frame and the non-action command frame.

21. The game apparatus set forth in claim 15 wherein the game image provider provides the competitive with the assigned turn with the window image having the action command frame and the non-action command frame to be displayed on the display device while excluding display of the game image.

* * * * *